(12) United States Patent
Hale et al.

(10) Patent No.: US 8,983,850 B2
(45) Date of Patent: Mar. 17, 2015

(54) TRANSLATION SYSTEM AND METHOD FOR MULTIPLE INSTANT MESSAGE NETWORKS

(75) Inventors: Mark Charles Hale, Whitby (CA); Leemon Baird, Cedar Park, TX (US)

(73) Assignee: Ortsbo Inc., Markham, Ontario (CA)

(*) Notice: Subject to any disclaimer, the term of this patent is extended or adjusted under 35 U.S.C. 154(b) by 63 days.

(21) Appl. No.: 13/554,926

(22) Filed: Jul. 20, 2012

(65) Prior Publication Data

US 2013/0024181 A1 Jan. 24, 2013

Related U.S. Application Data

(60) Provisional application No. 61/510,190, filed on Jul. 21, 2011.

(51) Int. Cl.
| G10L 21/00 | (2013.01) |
| G10L 25/00 | (2013.01) |
| G06F 17/28 | (2006.01) |
| H04L 12/58 | (2006.01) |

(52) U.S. Cl.
CPC ............ *G06F 17/289* (2013.01); *H04L 51/063* (2013.01); *H04L 51/04* (2013.01)
USPC ............ 704/277; 704/2; 704/3; 704/5; 704/8; 704/9

(58) Field of Classification Search
CPC combination set(s) only.
See application file for complete search history.

(56) References Cited

U.S. PATENT DOCUMENTS

| 5,497,319 | A | 3/1996 | Chong et al. ............. 364/419.02 |
| 6,161,082 | A | 12/2000 | Goldberg et al. ................. 704/3 |
| 7,221,933 | B2 * | 5/2007 | Sauer et al. ................. 455/412.1 |
| 7,849,144 | B2 | 12/2010 | Prajapat et al. ............... 709/206 |
| 2001/0014611 | A1 * | 8/2001 | Dufort |
| 2003/0125927 | A1 | 7/2003 | Seme ................. 704/3 |
| 2004/0019487 | A1 * | 1/2004 | Kleindienst et al. |
| 2004/0158471 | A1 * | 8/2004 | Davis et al. |
| 2005/0131811 | A1 * | 6/2005 | Ranzini et al. .................. 705/39 |
| 2005/0267738 | A1 * | 12/2005 | Wilkinson et al. |
| 2006/0004560 | A1 | 1/2006 | Whitelock ........................ 704/2 |
| 2006/0133585 | A1 * | 6/2006 | Daigle et al. |

(Continued)

FOREIGN PATENT DOCUMENTS

| JP | 2003-058481 | | 2/2003 |
| JP | 2003058481 | * | 2/2003 |

(Continued)

OTHER PUBLICATIONS

International Searching Authority International Search Report—International Application No. PCT/US2012/047729, dated Jan. 30, 2013, together with the Written Opinion of the International Searching Authority, 10 pages [13726/1009WO].

*Primary Examiner* — Richemond Dorvil
*Assistant Examiner* — Thuykhanh Le
(74) *Attorney, Agent, or Firm* — Sunstein Kann Murphy & Timbers LLP

(57) ABSTRACT

A method and system provides a graphical user interface for instant messaging on any of a plurality of instant messaging networks. The interface provides a roster of contacts in each instant messaging network. Instant messages entered through the interface are machine translated into a preferred language for each intended recipient contact. The translated message is sent over the respective instant messaging networks of the intended recipient contacts. Response messages are translated into the source language of the user of the graphical user interface.

9 Claims, 10 Drawing Sheets

(56) References Cited

U.S. PATENT DOCUMENTS

| | | | |
|---|---|---|---|
| 2007/0140443 A1* | 6/2007 | Woodring | |
| 2007/0168450 A1 | 7/2007 | Prajapat et al. | 709/207 |
| 2007/0202897 A1* | 8/2007 | Smith | |
| 2007/0208813 A1* | 9/2007 | Blagsvedt et al. | 709/206 |
| 2007/0260693 A1* | 11/2007 | Cardone et al. | |
| 2007/0294078 A1* | 12/2007 | Kim et al. | 704/2 |
| 2008/0243472 A1* | 10/2008 | DeGroot et al. | |
| 2008/0262827 A1* | 10/2008 | DeGroot | |
| 2009/0083024 A1 | 3/2009 | Suzuki et al. | 704/4 |
| 2010/0145694 A1* | 6/2010 | Ju et al. | |
| 2010/0286977 A1* | 11/2010 | Chin et al. | |
| 2010/0293230 A1* | 11/2010 | Lai et al. | 709/206 |
| 2011/0106931 A1* | 5/2011 | Smith | |
| 2011/0246881 A1 | 10/2011 | Kushman et al. | 715/708 |
| 2011/0307244 A1 | 12/2011 | He et al. | 704/4 |

FOREIGN PATENT DOCUMENTS

| | | |
|---|---|---|
| KR | 10-2006-056655 | 5/2006 |
| KR | 10-2006-056655 | * 10/2006 |

* cited by examiner

TRANSLATION SYSTEM AND METHOD FOR MULTIPLE INSTANT MESSAGE NETWORKS The present application claims priority from U.S. provisional application Ser. No. 61/510,190, filed Jul. 21, 2011, said application being hereby incorporated herein by reference in its entirety.

TECHNICAL FIELD

The present invention relates to instant messages, and more particularly to translation of instant messages.

BACKGROUND ART

Instant messaging offers people an opportunity to communicate in real time with others over the internet. Instant messaging can be one-to-one using point to point communication. Alternatively, communications can be multicast providing instantaneous on-line chatting among a group of people. Typically, instant messages are text-based messages pushed instantaneously from a sender to a receiver. More advanced messaging allows for voice, video and hyperlinks. Users of an instant messaging service typically have a contact roster and are apprised of who among their contacts are on-line. A user can select one or more of the contacts for conducting an instant messaging session.

Given that the internet allows access internationally, contacts involved in a chat might not share the same native language. Systems have been contemplated for providing translation of messages between instant messaging users. In accordance with US 2003/0125927 (Seme), a content translation module is provided along an instant messaging network so that messages sent through the network are translated and forwarded to the destination device. Alternatively, Seme suggests locating a content translation module on a source device and/or a destination device.

SUMMARY OF THE EMBODIMENTS

Illustrative embodiments of the present invention are directed to providing via the internet a graphical user interface to a user computer for instant messaging. The graphical user interface is configured so that a user can select a contact or two or more contacts of the user from any of a plurality of existing instant messaging networks associated with both the user and the contacts. The graphical user interface is further configured so that the user can specify an instant message to be sent to the contact using any of the existing instant messaging networks. The graphical user interface also allows the user to select a preferred language for the contact or contacts.

The computer system receives via the internet an instant message specified by the user to be sent to the contact or contacts. The instant message is received via the graphical user interface. The computer system also receives from the user a selection of the preferred language for the contact or contacts.

The computer system causes machine translation of the instant message specified by the user to the preferred language of the contact or contacts. In some embodiments, the computer system itself translates the instant message in the preferred language of the contact or contacts. In additional or alternative embodiments, however, the computer system causes translation by providing, via the internet, the instant message to a translation server and receiving, via the internet, from the translation server the instant message in the second preferred language of the contact.

The computer system then provides, via the internet, the instant message to the existing instant messaging network or networks associated with the contact or contacts for delivery of the instant message to the contact or contacts. The instant message is provided to each instant messaging network in the preferred language of the associated contact.

In further illustrative embodiments of the present invention, the computer system receives, via the internet, a responsive instant message from the existing instant messaging network. The responsive instant message is sent from the contact to the user. The computer system causes machine translation of the second instant message from the preferred language of the contact to a source language of the user. In some embodiments, the computer system itself translates the responsive instant message in the preferred language of the contact. In additional or alternative embodiments, however, the computer system causes translation by providing, via the internet, the responsive instant message to a translation server and receiving, via the internet, from the translation server the responsive instant message in the second preferred language of the contact. The computer system then provides via the internet, through the graphical user interface, the responsive instant message to the user in the source language of the user.

In various illustrative embodiments of the present invention, the graphical user interface is further configured so that the user can select the source language for the user. In additional or alternative embodiments, however, the computer system determines a source language for the user by analyzing the instant message sent by the user.

Also, in further illustrative embodiments of the present invention, the graphical user interface is further configured to display contacts of the user associated with a first existing instant messaging network of the user and also contacts of the user associated with at least one other existing instant messaging network. The graphical user interface is further configured so that the user can select a contact or contacts and specify an instant message to be sent to the contact or contacts. The existing instant messaging networks may be any one or more of Windows Live Messenger, Facebook, Google Talk, Tencent QQ, Yahoo! Messenger, iChat, AIM, ICQ, Gadu-Gadu, Lotus Sametime, LiveJournal, and Nokia Ovi.

For chats with contacts on more than one instant messaging network, upon receiving a responsive instant message from a contact on one of the instant messaging networks, the computer system automatically sends the responsive message over the other instant messaging network or networks to the contact or contacts thereon. The computer system may perform a further feature of translating, if needed, the received responsive message into the preferred language of the contact or contacts on the other instant messaging network before sending it out. For clarity, the translated responsive message is marked with identification of the original source of the message.

The described methodology can be employed in a computer system wherein the computer system may include one or more processors that enable aspects of the invention. In various exemplary embodiments, the computer system includes a server module configured to provide via the internet the graphical user interface described above. Furthermore, such a system may include a translation module configured to cause translation of instant messages. The system may also include an IM network module configured to communicate with existing instant messaging networks. Additionally or alternatively, the methodology can be implemented in computer code and stored on a non-transitory computer readable medium for operation on a computer or computer system where the computer readable medium contains computer code thereon.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
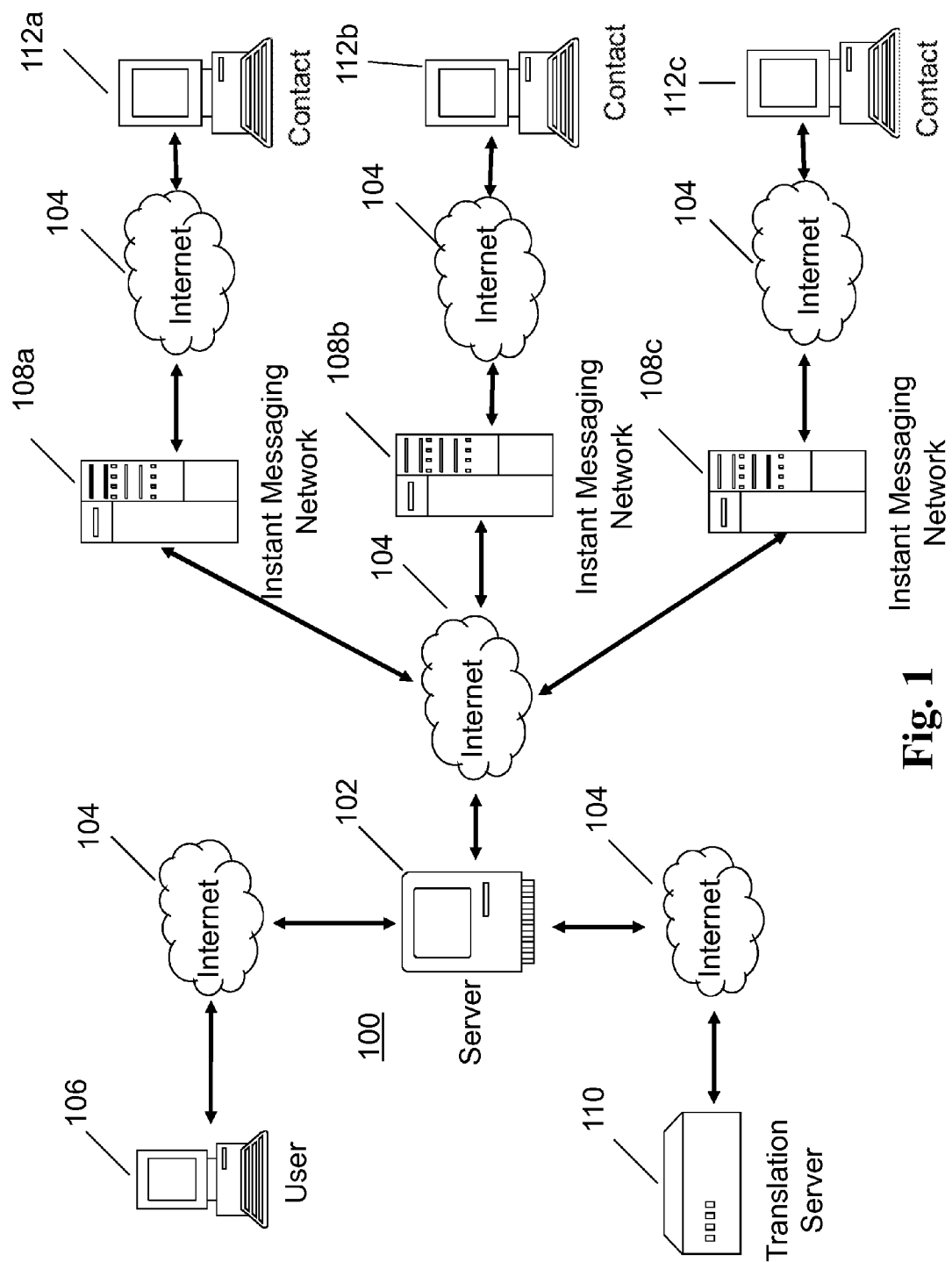
FIG. 1 shows a system for translation of instant messages in accordance with one embodiment of the present invention.

Illustrative embodiments of the present invention are directed to a system and method for providing a graphical user interface for facilitating translation of instant messages on a plurality of existing instant messaging networks. FIG. 1 shows a system 100 for translation of instant messages in accordance with one embodiment of the present invention. The system 100 includes a server 102 for communicating over the internet 104 with a user 106 (e.g., a client computer), any of a plurality existing instant messaging networks 108a, 108b, 108c and a translation server 110. The server 102 provides via the internet 104 a graphical user interface. In some embodiments, the graphical user interface is a web page that is provided within the user's web browser 106. In other illustrative embodiments, the graphical user interface is an application that is downloaded via the internet and installed onto the user's computer 106. The graphical user interface allows the user 106 to select a contact 112 and initiate an instant messaging session with the contact.

Figure 2:
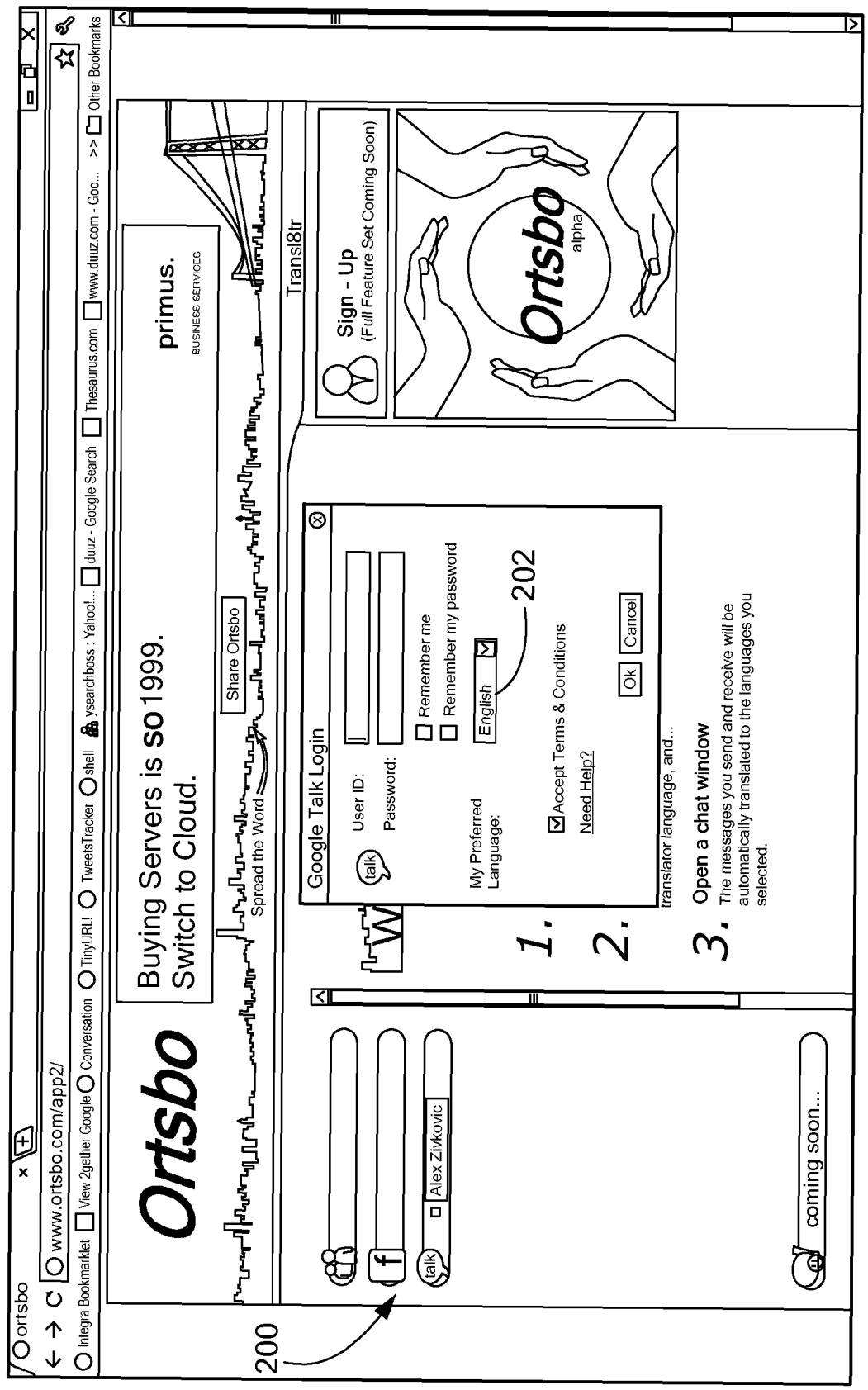
FIG. 2 shows a screen shot of a graphical user interface in accordance with one embodiment of the present invention.

FIG. 2 shows a screen shot of a graphical user interface 200 in accordance with one embodiment of the present invention. In FIG. 2, the graphical user interface 200 is a web page. On the left hand side of the web page, three instant messaging networks are displayed (e.g., Windows Live Messenger, Facebook, and Google Talk). In FIG. 2, the user 106 decides to log into Google Talk using his user ID and password. The graphical user interface 200 provided by the server 102 also allows the user 106 to select his source language. In other words, the user 106 selects the language that he will be using to send the instant message. In this case, the user 106 "Alex Zivkovic" has selected "English" as his source language from a pull down menu 202. In additional or alternative embodiments, the server 102 automatically determines the source language by analyzing the textual information within the instant message itself. Automatic detection of language based on text is a common feature of language translation application programming interfaces (API) such as Google Translate API.

Figure 3:
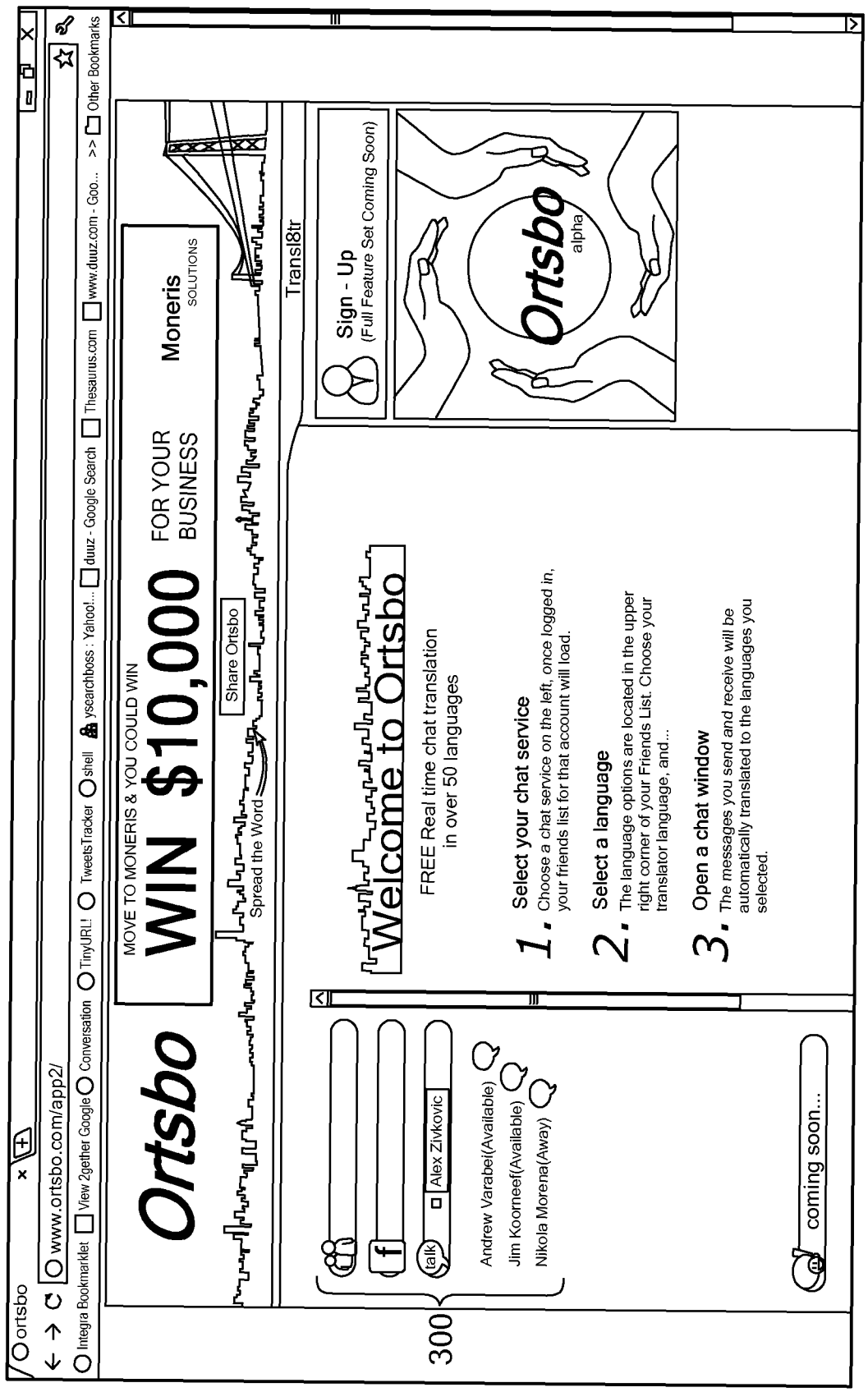
FIG. 3 shows a screen shot of a contact roster in accordance with one embodiment of the present invention.

FIG. 3 shows a screen shot of a contact roster 300 in accordance with one embodiment of the present invention. Once the user 106 has logged into the instant messaging network 108, the server 102 interfaces with the instant messaging network 108 and retrieves the user's contacts 112 from the instant messaging network. The graphical user interface 200 will then display the user's contact roster 300 for the instant messaging network. The contact roster 300 appears on the left-hand side of the window under a "Google Talk" tab. In FIG. 3, the contact roster 300 includes all the user's contacts that are currently logged into Google Talk. To initiate an instant messaging session, the user 106 can select a contact 112a, 112b, 112c and an instant messaging window addressed to that contact will appear.

Figure 4:
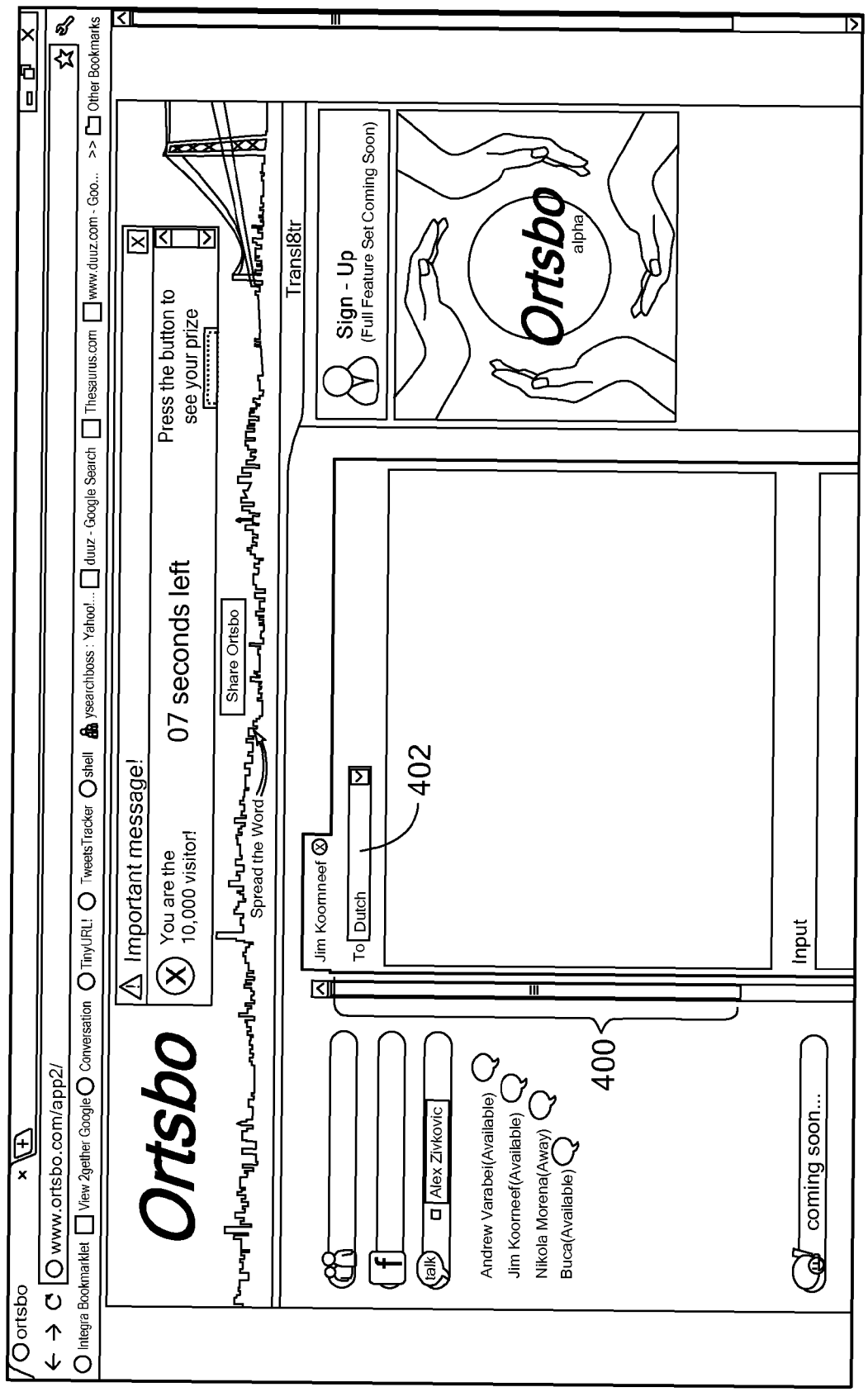
FIG. 4 shows a screenshot of a messaging window in accordance with one embodiment of the present invention.

FIG. 4 shows a screenshot of a messaging window 400 in accordance with one embodiment of the present invention. The messaging window 400 allows the user 106 to send an instant message to a contact 112a and also to select a preferred language for the contact. In this case, the user 106 has selected "Jim Koorneef" as the contact 112a that he would like to instant message. The user 106 has selected "Dutch" as the contact's preferred language. The language is selected from a pull-down menu 402 that includes a number of different languages (e.g., English, Dutch, Serbian, and Spanish). Selection of the contact's preferred language as "Dutch" instructs the server 102 to translate the instant message from English into Dutch before it is sent to Jim Koorneef.

The graphic user interface according to further embodiments, permits the user 106 to add other contacts 112b, 112c for receipt of the message from either the same instant messaging network or, as illustrated, from any of the other instant messaging networks displayed on the user interface. A preferred language for each contact is selected. Thus, a multi-party chat can be conducted with multiple users in a variety of languages.

Figure 5:
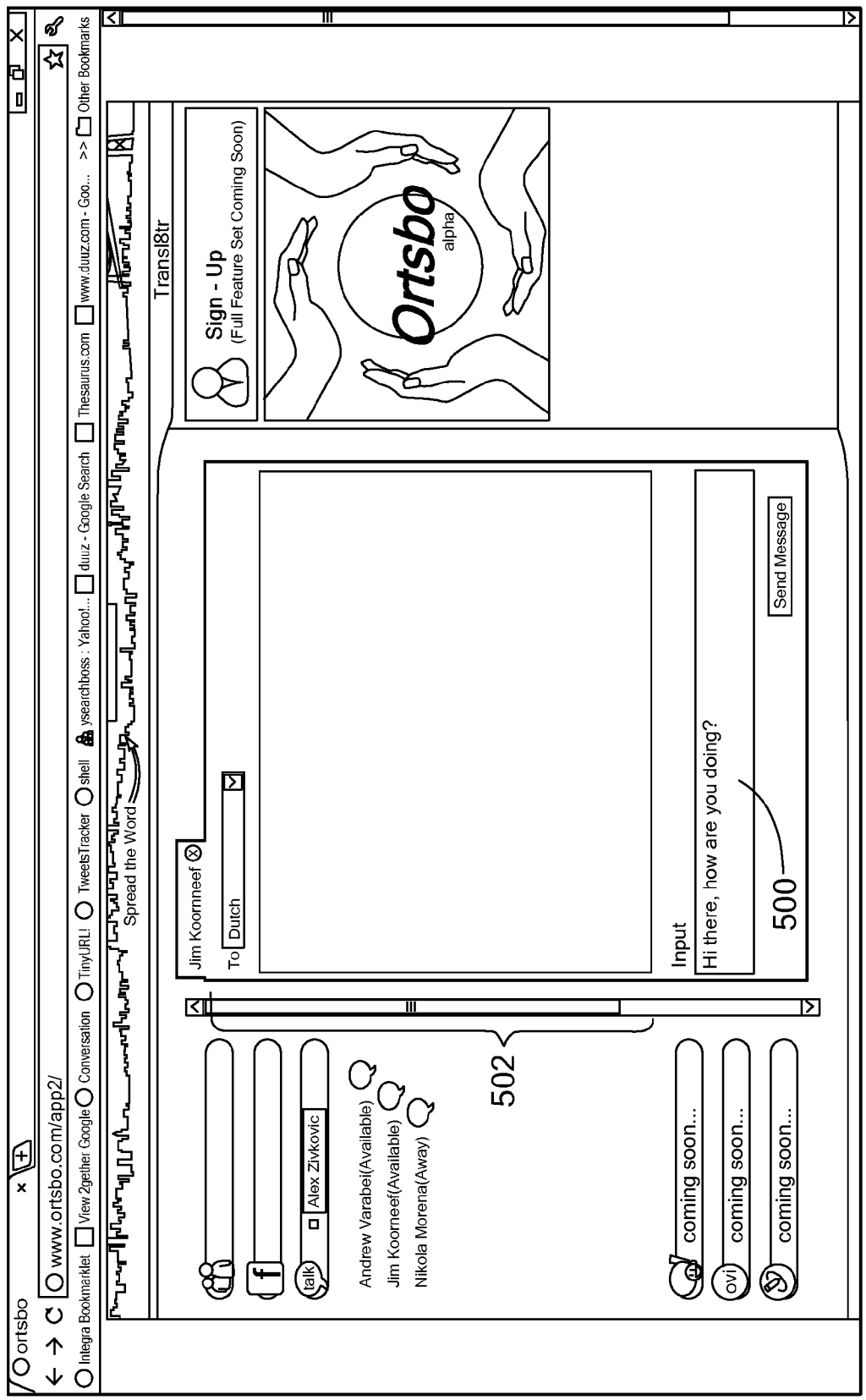
FIG. 5 shows a screen shot of an input field in accordance with one embodiment of the present invention.
Figure 6:
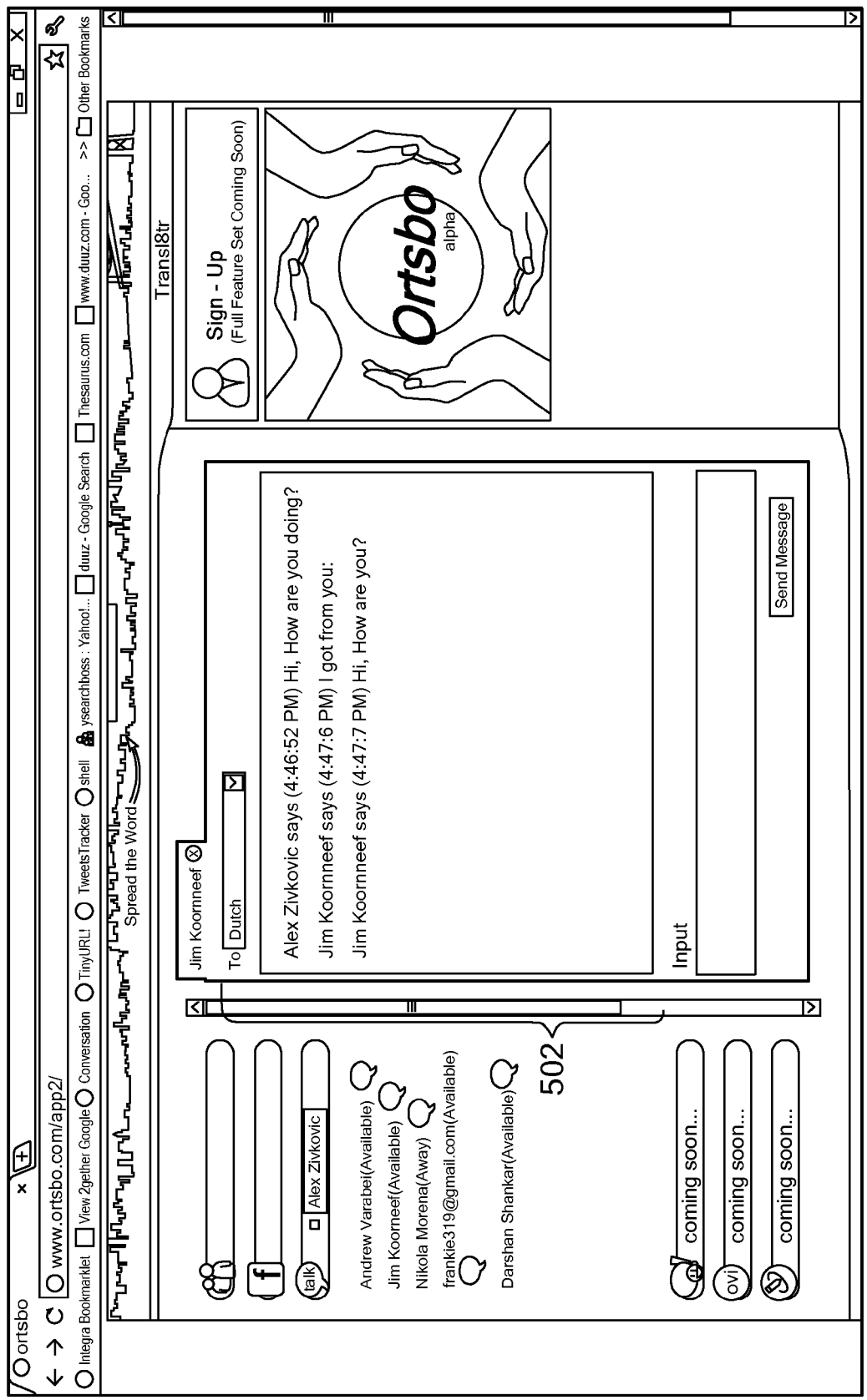
FIG. 6, shows a screen show of an output field in accordance with one embodiment of the present invention.

FIG. 5 shows a screen shot of an input field 500 in accordance with one embodiment of the present invention. As shown in FIG. 5, the graphical user interface 200 includes an input field 500 wherein the user 106 enters the instant message. In this case, the user 106 enters the message "Hi there, how are you doing?" The user 106 sends this message by, for example, selecting the "Send Message" button. Once sent, the message will appear in an output field 502 in the graphical user interface 200. As shown in FIG. 6, the output field 502 displays the conversation between the user 106 and the contact 112a (or multiple contacts 112a, 112b, 112c).

In illustrative embodiments, the server 102 then receives the instant message sent from the user 106 to the contact 112a (or contacts 112a, 112b, 112c). The server 102 also receives from the user 106 a selection of the preferred language for the contact 112a (or each of the contacts 112a, 112b, 112c). In some illustrative embodiments, the server 102 communicates with the translation server 110 to translate the instant message. For example, the server 102 will send the textual information portion of the instant message to the translation server 110 with instructions to translate the message to the preferred language of the contact 112a (or of each of the contacts 112a, 112b, 112c). The translation server 110 will then send back the translated contents to the server 102. Examples of translation servers 110 include Google Translator, Microsoft Translation API, and Babblefish. The advantage of using a translation server 110 is that the server 102 itself does not need to store dictionaries for term translation. Such dictionaries consume a great deal of memory and the process of translating the instant messages can be computationally intensive. In alternative embodiments of the invention, however, the server 102 itself includes a translation module for translating instant messages from various languages into other languages.

Once the server 102 receives the translated instant message, then the server 102 provides the translated instant message via the internet 104 to an instant messaging network 108a associated with the contact 112a (or to the instant messaging networks 108a, 108b, 108c associated with the contacts 112a, 112b, 112c). In this case, the translated instant message is sent to the Google Talk network. The instant messaging network 108 then sends the instant message to the user 106 via the internet 104. The message is received by the contact 112a (or contacts 112a, 112b, 112c) and displayed in the contact's preferred language so that the contact 112a can easily read the message. In some embodiments of the present invention, if the contact 112a is directly logged onto the instant messaging network, the instant message will be displayed in a graphical user interface provided by the network. For example, a contact 112a that is instant messaging using Facebook will see the user's instant message in a Facebook window. In this case, the contact 112a "Jim Koorneef" would receive the translated message in a Google Talk window.

After receiving the instant message, the contact 112a then has the option of sending a responsive instant message to the user 106. As explained above, the contact 112a uses the particular graphical user interface provided by the instant messaging network 108a and sends the user 106 a second instant message. In this case, the contact 112a "Jim Koorneef" sends the user 106 the messages "I got from you:" and "Hi, How are you?" The instant message is received by the instant messaging network 108a and then sent along via the internet 104 to the server 102. The server 102, in turn, sends the textual information portion of the second instant message to the server 102 with instructions to translate the message from the preferred language of the contact 112a to the source language of the user 106. Upon receipt of the translated message from the translation server 110, the translated responsive instant message is sent to the user 106 and displayed on the graphical interface 200 provided by the server 102 to the user. FIG. 6 shows a screen shot of an output field 502 in accordance with one embodiment of the present invention. The output field 502 displays the conversation including instant messages between the user 106 "Alex Zivkovic" and the contact 112a "Jim Koorneef". In this manner, illustrative embodiments of the present invention seamlessly translate instant messages between the user 106 and the contact 112a (or contacts 112a, 112b, 112c). Typically, the user 106 communicates directly with the server 102, while the contact 112a communicates directly with the instant messaging network 108. Thus, illustrative embodiments of the present invention advantageously shield the contacts 112a, 112b, 112c from the server 102 and, in illustrative embodiments, the contact is unaware that the server is acting to translate the instant messages being sent between the user and the contact. In this manner, the server 102 facilitates communication between users 106 and contacts 112a, 112b, 112c who may not otherwise be able to communicate using the same language. Furthermore, in illustrative embodiments of the present invention, there is no need for the contacts 112a, 112b, 112c to download applications or to sign onto other web pages (outside of his existing instant messaging network) in order to receive translated instant messages.

Additional features may be provided for handling responsive messages in a multi-party chat involving more than one of the instant messaging networks. Server 102 may be configured to automatically transmit a response message back to all of the instant messaging networks involved in the chat except for the network from which the response message originated. The instant messaging network of the originator will have already sent the message on its network to the users active in the chat. The server 102 in retransmitting the response message will preferably mark the response message with an identifier of the originator so as to distinguish the message from those of the original user. A convenient identifier could be a prefix with the name or initials of the sender or an icon or marking indicating the instant messaging network from where the response message originated.

Given that the preferred languages of the contacts involved in the chat may differ, a further feature may be implemented for use prior to retransmitting the response message. Translation of the response message is obtained into any preferred language of a contact on any of the other instant messaging networks that differs from the language of the original response language. The translated response message is automatically retransmitted on the instant messaging network of the contact having the preferred language into which the message was translated.

The retransmissions described above are only made to other instant messaging networks. If the translation and sending of translated response messages is to be permitted to contacts on the user's own instant messaging network, precautions need to be taken. It is possible for a chat taking place with multiple contacts on the same network that more than one of the contacts may be using the translation system described herein. Since an instant messaging system provides each message to all contacts in the chat who are on that instant messaging system, retransmissions and translations could proliferate if responses are automatically retransmitted by each of the translation systems actively involved in the chat. To preclude such redundant retransmissions, the server 102 can be configured to recognize the use of an identifier such as a prefix and avoid the retransmission and transmission processes if a received message is so marked. And it is configured to not translate messages for receivers using this system who are on the same network as the sender. Such receivers can be identified when they have transmitted at least one message with the identifier. These restraints are only necessary when retransmissions in the user's instant messaging network are allowed and when dealing with contacts who are on that same instant messaging network.

Figure 7:
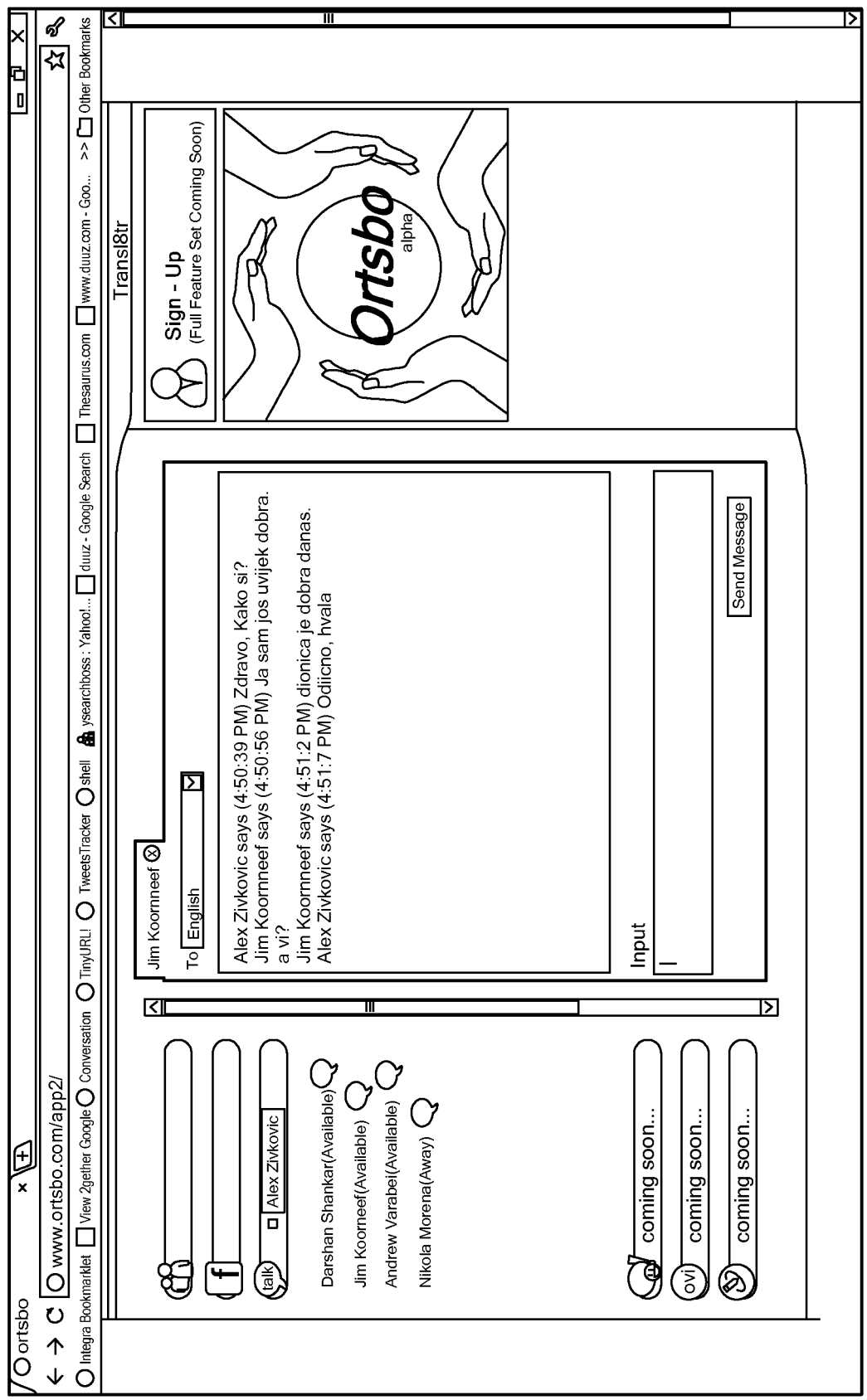
FIG. 7 shows a screen shot of an instant messaging session in another language in accordance with one embodiment of the invention.

FIG. 7 shows a screen shot of an instant messaging session in another language in accordance with one embodiment of the invention. In this case, the user 106 has selected Serbian as the source language and English as the contact's preferred language. Accordingly, the graphical user interface 200 displays the instant messages from the contact in Serbian, while instant messages sent from the user 106 to the contact would be displayed in English.

Figure 8:
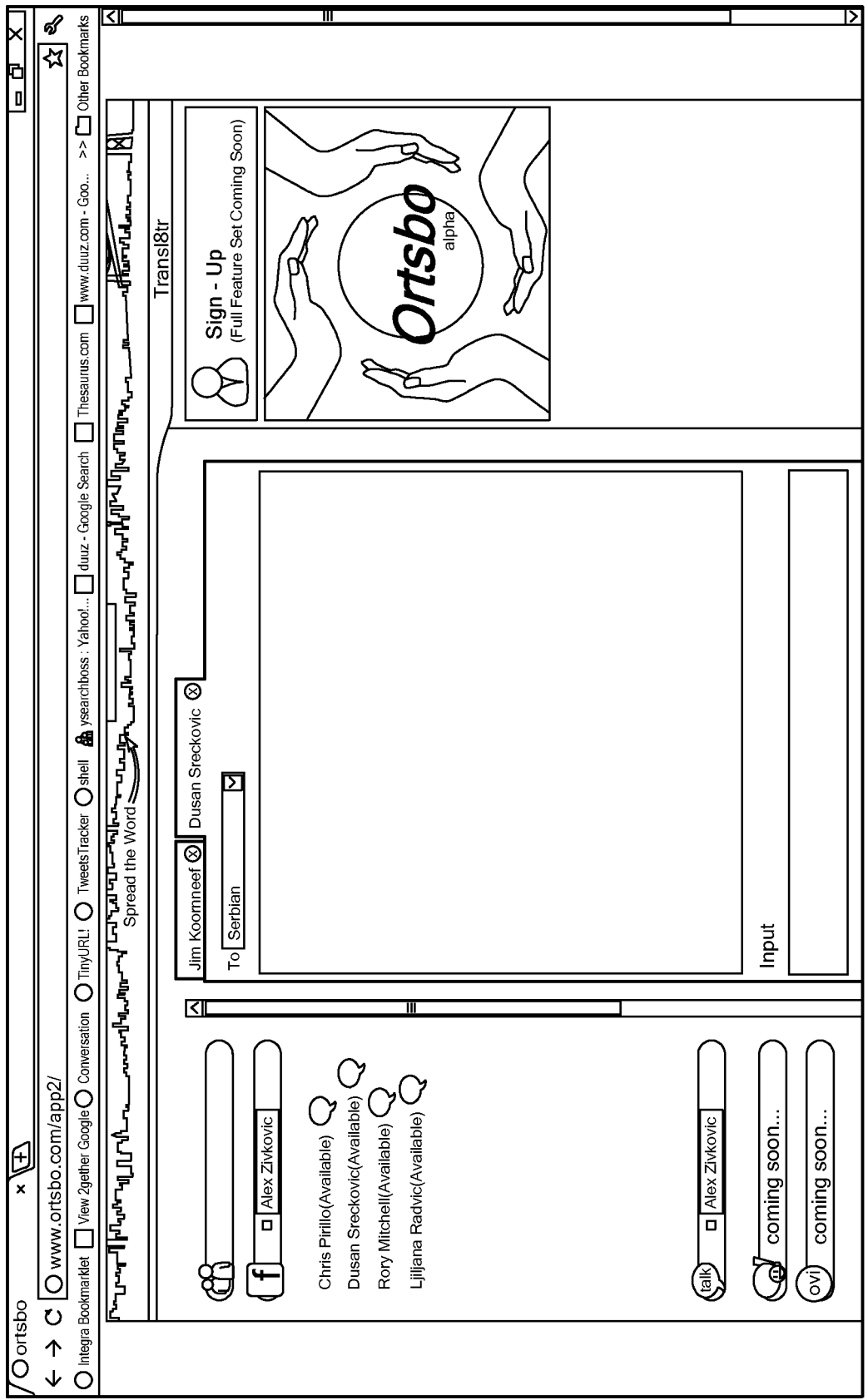
FIG. 8 shows a screen shot of two instant messaging sessions in accordance with one embodiment of the present invention.
Figure 9:
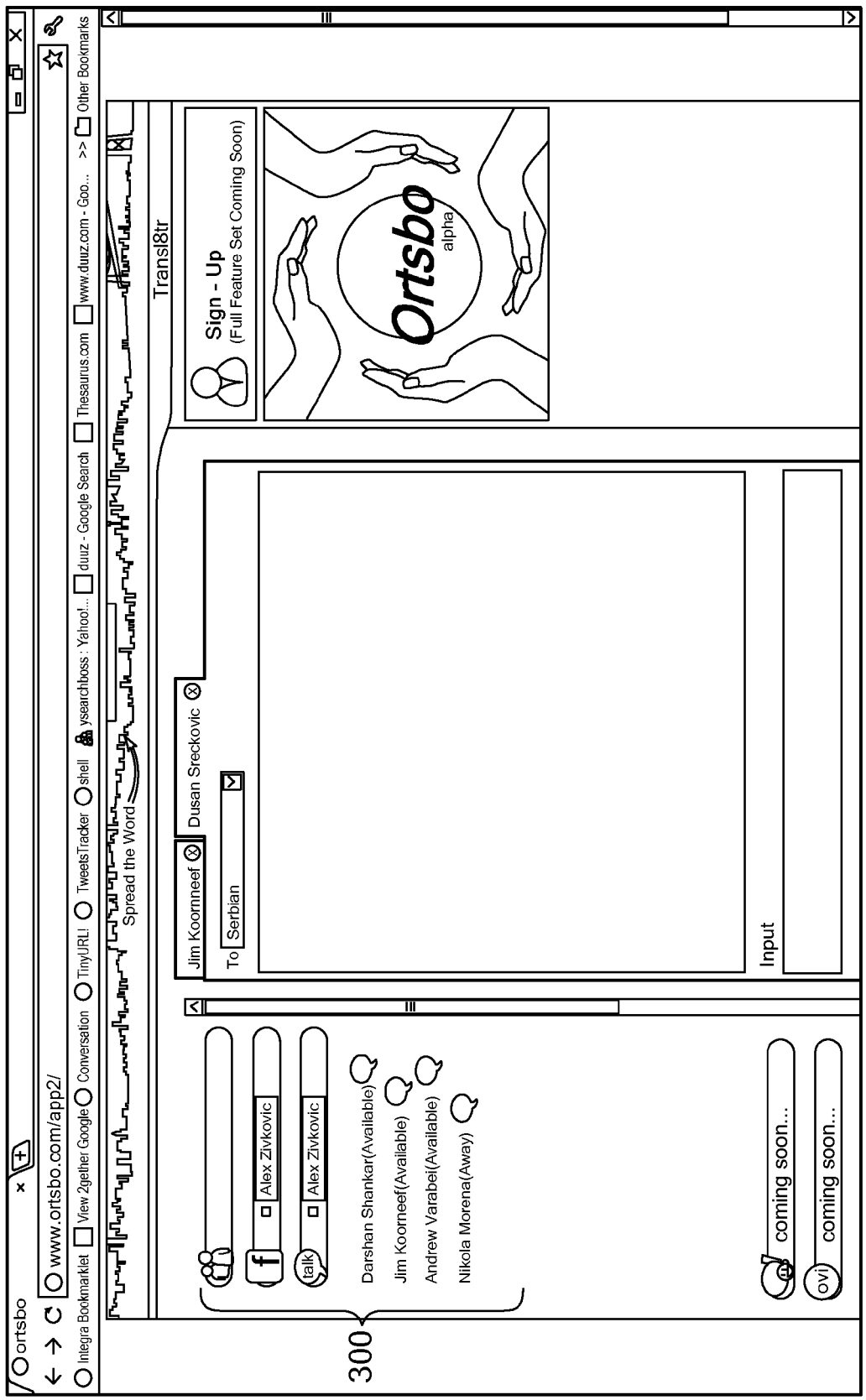
FIG. 9 shows a screen shot of a contact roster in accordance with another embodiment of the present invention.

FIG. 8 shows a screen shot of two instant messaging sessions in accordance with one embodiment of the present invention. In FIG. 8, the user 106 has signed into the Facebook instant messaging network 108 and initiated an instant messaging session with contact "Dusan Sreckovic". The user 106 has selected Serbian as the contact's preferred language. Thus, in illustrative embodiments of the present invention, the graphical user interface 200 and the server 102 can support instant messaging sessions for a plurality of contacts 112a, 112b, 112c. Furthermore, in illustrative embodiments, the graphical user interface 200 and server 102 can support sessions for a plurality of contacts 112a, 112b, 112c wherein the contacts are associated with various different instant messaging networks. In other words, the graphical user interface 200 is configured to display contacts of the user 106 associated with a first existing instant messaging network 108a of the user and also contacts of the user associated with at least one other existing instant messaging network 108b, 108c. For example, in FIG. 9, the window includes a contact roster 300 for all contacts associated with the Facebook instant messaging network 108 and also all of the user's contacts associated with the Google Talk instant messaging network. In this manner, the graphical user interface 200 conveniently integrates the user's contacts from a number of different existing instant messaging networks. An instant messaging chat session may be initiated with one or more of the contacts on one or more of the instant messaging networks. The session will be facilitated by translations of messages into preferred language of the receiving party.

In the examples above, the graphical user interface 200 and the server 102 supports Windows Live Messenger, Facebook, and Google Talk. In various illustrative embodiments of the present invention, the graphical user interface 200 and the server 102 can be extended to support other instant messaging networks. For example, illustrative embodiments of the present invention may be extended to support one or more of Tencent QQ, Yahoo! Messenger, iChat, AIM, ICQ, Gadu-Gadu, Lotus Sametime, LiveJournal, and Nokia Ovi.

In the examples provided above, the user 106 is using the graphical user interface 200 provided by the server 102, while the contact 112a is using a graphical user interface provided by an instant messaging network 108. In other embodiments, both the user 106 and the contact 112a can use the graphical user interface 200 provided by the server 102. In such an embodiment, the server 102 may use the source language of the user 106 and the source language of the contact 112a because both parties have the opportunity to select their own language using the graphical interface 200 provided by the server 102.

Figure 10:
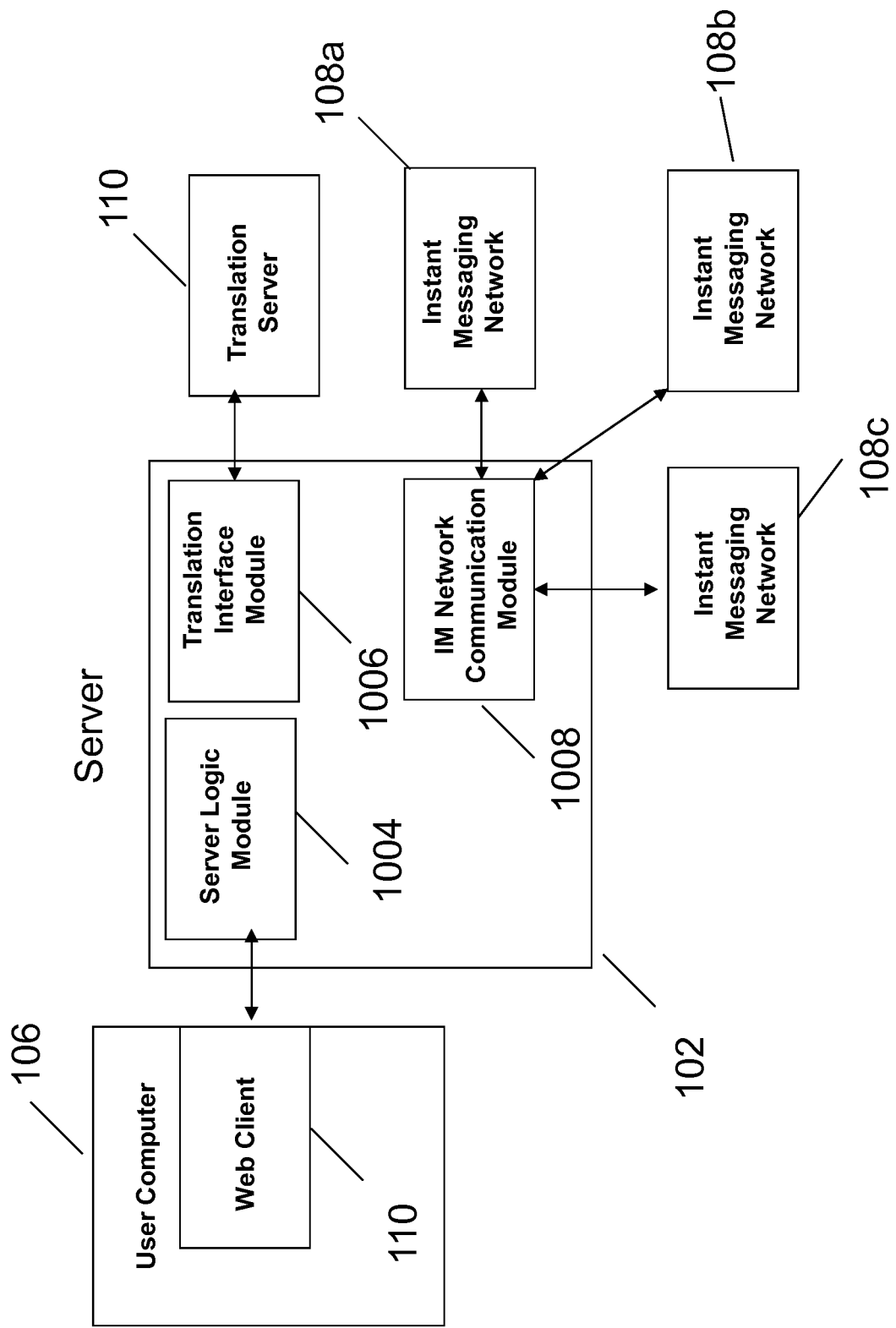
FIG. 10 shows a server in accordance with one embodiment of the present invention.

In illustrative embodiments of the invention, the server 102 includes a processor and a memory for storing instructions executable by the processor to perform certain computer processes. In various exemplary embodiments, the server 102 is programmed with various software modules. FIG. 10 shows a server 102 in accordance with one embodiment of the present invention. The server 102 is programmed with a server logic module 1004, translation interface module 1006, and an IM network communication module 1008.

In various illustrative embodiments of the server, the server logic module 1004 is responsible for communicating with at least one user computer 106. In illustrative embodiments of the invention, communicating with the user computer 106 is achieved by instantiating a web client 1010. The web client 1010 can be implemented as, for example, an applet, a Silverlight client, and/or an HTML+Ajax (JS) client. When the server 102 receives an instant message from the user 106, the server logic module 1004 instructs the IM network communication module 1008 to hold a communication channel open on behalf of the user 106. The server logic module 1004 further determines the source language for the user 106 and the preferred language for the contact 112a. For example, if an instant message is the first instant message received from the user 106, then, in illustrative embodiments, the source language for the user 106 and the preferred language for the contact 112a are received from the user by his selection of the source language and preferred language in the graphical user interface 200. Accordingly, the server logic module 1004 interprets the user's selection and invokes the translation interface module 1006 if there is a need for translating the instant message (e.g., the source and preferred languages are different). In various illustrative embodiments, the user's selection of the source language and the preferred language is saved in memory. If an instant message is received from the contact and/or if the instant message is not the first message received from the user, then, in some illustrative embodiments, the translation interface module 1006 retrieves the source language and the preferred language from memory. Similarly, if there is a need for translating the instant message, the server logic module 1004 invokes the translation interface module 1006. In additional or alternative embodiments, the server logic module 1004 determines the source language by analyzing the textual information within the instant message itself.

In illustrative embodiments of the server, the translation interface module 1006 receives the instant message and communicates with the translation server 110 to cause translation of the instant message. Examples of the translation server 110 include, but are not limited to, Google Translator, Microsoft Translation API, and Babblefish. In various illustrative embodiments, the translation interface module 1006 communicates with the translation server 1110 via the internet 104 using an application programming interface (API). In various exemplary embodiments, the translation APIs are accessed through various types of web calls such as Simple Object Access Protocol (SOAP), JavaScript Object Notation (JSON), Extensible Markup Language (XML) and/or Representational State Transfer (REST). The translation APIs allow an API caller to specify the textual information that needs to be translated, the current language of the textual information, and the desired language for the translation. In some illustrative embodiments, the current language is not provided because some translation APIs support auto-detection of the current language through analysis of the textual information (e.g., Google translation API). Furthermore, various translation APIs support translation of multiple instant messages at the same time which, in turn, improves the performance of the present system (e.g., Google translation API).

In various illustrative embodiments, the translation interface module 1006 provides the translation server 110 with the textual information contained within the instant message, a current language for the textual information, and the desired language for the translation (e.g., source language or preferred language). The message is translated by the translation server 110 into the desired language and returned to the translation interface module 1006 which, in turn, passes the translated instant message to the server logic module 1004. In other embodiments, as explained above, the translation interface module 1006 itself translates the instant message without sending it to the translation server 110.

In illustrative embodiments of the server 102, the translation interface module 1006 invokes multiple translation servers 110 for the same textual information in order to confirm that the translation is successful and/or accurate (e.g., the server translation interface module might compare the different translations against each other to determine a best one).

The server logic module 1004 passes the translated instant message to the IM network communication module 1008. The IM network communication module 1008, in turn, communicates with at least one instant messaging network (e.g., Windows Live Messenger, Facebook, and/or Google Talk) 108a, 108b, 108c. The IM network communication module 1008 sends the translated instant message to the instant messaging network via the internet 104. In various illustrative embodiments, the instant message is sent along with information identifying the individual that sent the message (e.g., user 106 or contact 112) and information identifying the recipient of the message (e.g., user 106 or contact 112a). For example, such information may include the username and instant messaging network associated with the individual. This information enables the instant messaging network 108 to route the instant message to the appropriate individual. In illustrative embodiments, the IM network communication module 1008 communicates with the instant messaging network using a particular application programming interface (API) for the network. Some instant messaging networks 108a, 108b, 108c (e.g., Google Talk, Facebook Chat, and Skype) use an Extensible Messaging and Presence Protocol (XMPP) for communication with their servers. XMPP is a standard and well known communications protocol (http://www.xmpp.org). Also, instant messaging networks 108a, 108b, 108c typically provide instructions and documentation for accessing and communicating with their various APIs. In various illustrative embodiments of the present invention, the IM network communication module 1008 uses APIs for any number of different instant messaging networks 108a, 108b, 108c and, thus, in this manner, is able to communicate with many different instant messaging networks.

When the contact 112a sends a responsive instant message to the user 106, the instant message is received by the contact's instant messaging network 108a and sent to the server 102. The IM network communication module 1008 receives the instant message and passes it to the server logic module 1004. The server logic module 1004 looks up the source language for the user 106 and the preferred language for the contact 112a. If a translation is necessary (e.g., the source and preferred languages are different), the server logic module 1004 forwards the instant message to the translation interface module 1006. As explained above, the translation interface module 1006 communicates with a translation server 110 to translate the instant message into the source language from the preferred language of the contact 112a. The translated instant message is then passed back to the server logic module 1004 and sent via the internet 104 to the user computer 106 for display using the graphical user interface 200.

In further illustrative embodiments of the present invention, the system of the present invention is implemented in a different manner. For example, in some illustrative embodiments, the server logic module 1004 and the translation interface module 1006 are not located within the server 102, but instead are located at the user computer 106 as part of a web application program. In such an embodiment, the machine translation of the instant messages is activated directly by the web application program at the user computer 106.

It should be noted that terms such as "server" "system" and "processor" may be used herein to describe devices that may be used in certain embodiments of the present invention and should not be construed to limit the present invention to any particular device type or system unless the context otherwise requires. Thus, a system may include, without limitation, a client, server, computer, appliance, or other type of device. Such devices typically include one or more network interfaces for communicating over a communication network and a processor (e.g., a microprocessor with memory and other peripherals and/or application-specific hardware) configured accordingly to perform device and/or system functions. The examples described above use the internet, but illustrative embodiments of the present may extend to other communications networks. Such communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies, networking technologies, and internet working technologies.

It should also be noted that devices may use communication protocols and messages (e.g., messages created, transmitted, received, stored, and/or processed by the system), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message. Unless the context requires otherwise, references to specific communication protocols are exemplary, and it should be understood that alternative embodiments may, as appropriate, employ variations of such communication protocols (e.g., modifications or extensions of the protocol that may be made from time-to-time) or other protocols either known or developed in the future.

It should also be noted that logic flows may be described herein to demonstrate various aspects of the invention, and should not be construed to limit the present invention to any particular logic flow or logic implementation. The described logic may be partitioned into different logic blocks (e.g., programs, modules, interfaces, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, Java, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internet working technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internet working technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention.

What is claimed is:

1. A method for translation of instant messages, the method comprising:
    providing via internet a graphical user interface for instant messaging on any of a plurality of instant messaging networks, the graphical user interface configured so that a user can (i) select two or more contacts of the user, from the plurality of instant messaging networks, and (ii) specify an instant message to be sent to the contacts using the instant messaging network associated with each of the contacts, the graphical user interface also allowing the user to select a preferred language for each of the contacts;
    receiving via the internet a first instant message specified by the user, via the graphical user interface, to be sent to the two or more contacts and receiving from the user a selection of the preferred language for each contact;
    causing machine translation of the first instant message specified by the user to the preferred languages of the contacts;
    providing via the internet the first instant message to the instant messaging networks associated with each of the contacts for delivery of the instant message to the contacts, the instant message being provided to each contact in the preferred language of the contact;
    receiving via the internet a second instant message from one of the instant messaging networks, the second instant message being sent from one of the contacts to the user;
    causing translation of the second instant message from the preferred language of the one of the contacts to a source language of the user; and
    providing via the internet, through the graphical user interface, the second instant message to the user in the source language of the user, wherein the second instant message is automatically transmitted back to all of the instant messaging networks except the one from which it originated, with a prefix identifying which user originally sent it.

2. A method according to claim 1, wherein the graphical user interface is further configured so that the user can select the source language for the user.

3. A method according to claim 1, further comprising:
    determining a source language for the user by analyzing the first instant message.

4. A method according to claim 1, in which the automatically transmitted message is translated into the language for each user in that user's preferred language.

5. A method according to claim 1, wherein causing translation of the first instant message specified by the user includes providing via the internet the first instant message to a translation server and receiving via the internet, from the translation server, the first instant message in the preferred languages of the contacts.

6. A method for translation of instant messages, the method comprising:
    providing via internet a graphical user interface for instant messaging on any of a plurality of instant messaging networks, the graphical user interface configured so that a user can (i) select two or more contacts of the user, from the plurality of instant messaging networks, and (ii) specify an instant message to be sent to the contacts using the instant messaging network associated with each of the contacts, the graphical user interface also allowing the user to select a preferred language for each of the contacts;
    receiving via the internet a first instant message specified by the user, via the graphical user interface, to be sent to the two or more contacts and receiving from the user a selection of the preferred language for each contact;
    causing machine translation of the first instant message specified by the user to the preferred languages of the contacts;
    providing via the internet the first instant message to the instant messaging networks associated with each of the contacts for delivery of the instant message to the contacts, the instant message being provided to each contact in the preferred language of the contact;

receiving via the internet a second instant message from one of the instant messaging networks, the second instant message being sent from one of the contacts to the user;

causing translation of the second instant message from the preferred language of the one of the contacts to a source language of the user;

providing via the internet, through the graphical user interface, the second instant message to the user in the source language of the user; and translating the second instant message into the preferred language of any contacts on the user's instant messaging network, if different from the language of the second instant message, and sending the translated message to contacts on the user's instant messaging network, but refraining from translating and sending if the second instant message has been marked identifying it as an already translated message and refraining from translating and sending if any message so marked was previously received from the contact with a different language.

7. A method according to claim 6, wherein the graphical user interface is further configured so that the user can select the source language for the user.

8. A method according to claim 6, further comprising:
determining a source language for the user by analyzing the first instant message.

9. A method according to claim 6, wherein causing translation of the first instant message specified by the user includes providing via the internet the first instant message to a translation server and receiving via the internet, from the translation server, the first instant message in the preferred languages of the contacts.

* * * * *